United States Patent
Shanmugam et al.

(10) Patent No.: US 12,380,061 B2
(45) Date of Patent: Aug. 5, 2025

(54) TECHNIQUE SELECTION FOR FILE SYSTEM UTILIZATION PREDICTION

(71) Applicant: Kyndryl, Inc., New York, NY (US)

(72) Inventors: Sundaravelu Shanmugam, Karnataka (IN); Vidhya Shankar Venkatesan, Bangalore (IN); Amol Bhaskar Mahamuni, Bangalore (IN)

(73) Assignee: Kyndryl, Inc., Armonk, NY (US)

( * ) Notice: Subject to any disclaimer, the term of this patent is extended or adjusted under 35 U.S.C. 154(b) by 409 days.

(21) Appl. No.: 16/863,640

(22) Filed: Apr. 30, 2020

(65) Prior Publication Data
US 2021/0342290 A1    Nov. 4, 2021

(51) Int. Cl.
G06F 16/11    (2019.01)
G06F 16/17    (2019.01)
G06N 3/08    (2023.01)

(52) U.S. Cl.
CPC .......... G06F 16/11 (2019.01); G06F 16/1734 (2019.01); G06N 3/08 (2013.01)

(58) Field of Classification Search
CPC ...... G06F 16/11; G06F 16/1734; G06F 16/17; G06N 3/08
See application file for complete search history.

(56) References Cited

U.S. PATENT DOCUMENTS

| | | | |
|---|---|---|---|
| 10,205,640 B2 | 2/2019 | Chan et al. | |
| 2007/0106636 A1* | 5/2007 | Sridharan | G06F 11/004 |
| 2007/0260732 A1* | 11/2007 | Koretz | H04L 67/1012 709/226 |
| 2007/0283360 A1 | 12/2007 | Koretz et al. | |
| 2011/0276573 A1* | 11/2011 | Wang | G06F 16/1734 707/E17.09 |
| 2012/0101995 A1* | 4/2012 | Agetsuma | G06F 3/0649 707/E17.044 |
| 2013/0159220 A1* | 6/2013 | Winn | G06F 16/337 706/12 |

(Continued)

OTHER PUBLICATIONS

Stokely et al., Projecting Disk Usage Based on Historical Trends in a Cloud Environment, Proceedings of the 3rd international workshop on Scientific cloud computing, Jun. 18, 2012, p. 1-8 (Year: 2012).*

(Continued)

*Primary Examiner* — Pierre M Vital
*Assistant Examiner* — Andrew N Ho
(74) *Attorney, Agent, or Firm* — Erik Swanson; Andrew M. Calderon; Calderon Safran & Wright P.C.

(57) ABSTRACT

A trained classification model is executed, causing a classification of a first set of file system usage data into a set of categories comprising a trend category and a periodicity category. Responsive to the first set of file system usage data being classified into the trend category, a time series of the first set of file system usage data is generated. Responsive to the first set of file system usage data being classified into the periodicity category, using an anomaly detection model, an anomaly within the first set of file system usage data is detected. Responsive to predicting that the time series will exceed a threshold, a first reconfiguring of a file system resource is caused, altering a capacity of the file system. Responsive to detecting the anomaly, a second reconfiguring of the file system resource is caused, altering a capacity of the file system.

20 Claims, 11 Drawing Sheets

(56) References Cited

U.S. PATENT DOCUMENTS

| | | | | |
|---|---|---|---|---|
| 2013/0185236 | A1* | 7/2013 | Tonouchi | G06F 11/3485 706/20 |
| 2014/0156793 | A1* | 6/2014 | Chan | G06F 16/93 709/217 |
| 2014/0310235 | A1* | 10/2014 | Chan | G06F 16/285 707/603 |
| 2016/0042287 | A1* | 2/2016 | Eldardiry | G06Q 50/22 706/14 |
| 2016/0203036 | A1* | 7/2016 | Mezic | G06F 11/0751 714/819 |
| 2017/0097863 | A1* | 4/2017 | Ishii | G06F 11/0778 |
| 2017/0228661 | A1* | 8/2017 | Chien | G06F 16/285 |
| 2017/0249376 | A1* | 8/2017 | Garvey | G06Q 30/0202 |
| 2018/0144251 | A1* | 5/2018 | Chou | H04L 67/60 |
| 2018/0324199 | A1* | 11/2018 | Crotinger | G06F 16/285 |
| 2019/0197413 | A1 | 6/2019 | Veasey et al. | |

OTHER PUBLICATIONS

Stokely et al., Projecting Disk Usage Based on Historical Trends in a Cloud Environment, Proceedings of the 3rd international workshop on Scientific cloud computing, Jun. 18, 2012, https://static.googleusercontent.com/media/research.google.com/en//pubs/archive/37747.pdf.

Hardageri et al., Sizr: Visualizing HDFS utilization at LinkedIn, LinkedIn.Com, Jan. 8, 2016, https://engineering.linkedin.com/blog/2016/01/sizr--visualizing-hdfs-utilization-at-linkedin.

Manage Engine, Storage Capacity Forecasting and Planning, ManageEngineOpManager, 2020, https://www.manageengine.com/network-monitoring/storage-capacity-forecasting-planning.html.

Smith, Workload-Specific File System Benchmarks, Jan. 2001.

Srivastava, An Alternative to Deep Learning? Guide to Hierarchical Temporal Memory (HTM) for Unsupervised Learning, Analytics Vidhya May 14, 2018, https://www.analyticsvidhya.com/blog/2018/05/alternative-deep-learning-hierarchical-temporal-memory-htm-unsupervised-learning/.

Ding et al., RADM: Real-Time Anomaly Detection in Multivariate Time Series Based on Bayesian Network, 2018 IEEE International Conference on Smart Internet of Things (SmartIoT), Aug. 17-19, 2018.

Ahmad et al., Unsupervised real-time anomaly detection for streaming data, Neurocomputing 262 (2017), 134-147.

Nichols, Anomaly Detection for DevOps: 3 Types of Monitoring Tools, Cloud Compass, 2020, https://www.metricly.com/3-types-anomaly-detection-monitoring-tools/.

Colah's Blog, Understanding LSTM Networks, Aug. 27, 2015, https://colah.github.io/posts/2015-08-Understanding-LSTMs/.

Wikipedia, Precision and recall, Mar. 12, 2020, https://en.wikipedia.org/wiki/Precision_and_recall.

Durasevic, Anomaly detection using SMART indicators for hard disk drive failure prediction, Proceedings of 4th International Conference on Electrical, Electronics and Computing Engineering, IcETRAN 2017, Kladovo, Serbia, Jun. 05-08.

Stack Overflow, Anomaly detection for CPU usage, Mar. 30, 2020, https://stackoverflow.com/questions/44492124/anomaly-detection-for-cpu-usage.

Wikipedia, Software bug, Mar. 30, 2020, https://en.wikipedia.org/wiki/Software_bug.

professional qa.com, Anomaly in Software Testing, Apr. 18, 2019, https://www.professionalqa.com/anomaly-in-software-testing.

Wu, Metrics, Techniques and Tools of Anomaly Detection: A Survey, http://www.cse.wustl.edu/~jain/cse567-17/ftp/mttad/index.html.

Du et al., DeepLog: Anomaly Detection and Diagnosis from System Logs through Deep Learning, CCS'17, Oct. 30-Nov. 3, 2017, Dallas, TX, USA.

* cited by examiner

US 12,380,061 B2

TECHNIQUE SELECTION FOR FILE SYSTEM UTILIZATION PREDICTION

BACKGROUND

The present invention relates generally to a method, system, and computer program product for file system utilization prediction. More particularly, the present invention relates to a method, system, and computer program product for technique selection for file system utilization prediction.

A file system controls how data is stored and retrieved. In particular, a file system groups data into files, and uses data structures and logic rules to manage files and their names. File systems can be used on numerous different types of storage devices that use different kinds of media. Some file systems are used on local data storage devices, while others provide file access across a network. A filename, or file name, is used to identify a storage location in the file system. A set of directories, or folders, group files. In file systems administered by some operating systems, directory structures are flat, while other operating system allow hierarchies in which directories can contain subdirectories. Metadata is data about files and directories, for example a name, file size, the location of the file in the directory hierarchy, a timestamp describing when the file was last accessed or edited, and permissions associated with a file or directory.

Typically, a file system includes files associated with a specific user (i.e. user files or user directories), files that are components of specific applications, and files needed for system administration. Application and system administration directories often have an allocated capacity, and nearing or exceeding that allocated capacity can cause an application to slow down, hang, or exhibit unexpected behavior. In such a scenario, a human operations team or predefined automatic system work to free up space by performing clean-up activities such as consolidating fragmented file system space or increasing the allocated capacity if the demand is predicted to continue. In a data center environment with hundreds of severs, each with ten or more directories, managing file system storage space utilization can be complex.

SUMMARY

The illustrative embodiments provide a method, system, and computer program product. An embodiment includes a method that executes, using a processor and a memory, a trained classification model, the executing causing a classification of a first set of file system usage data into a set of categories, the set of categories comprising a trend category and a periodicity category, the first set of file system usage data comprising usage data of a file system on a data storage device. An embodiment causes, using the processor and the memory, at least one operation from a set of operations, the set of operations comprising (i) generating, responsive to the first set of file system usage data being classified into the trend category, a time series of the first set of file system usage data, and (ii) detecting, responsive to the first set of file system usage data being classified into the periodicity category, using an anomaly detection model, an anomaly within the first set of file system usage data. An embodiment causes, using the processor and the memory, at least one alteration from a set of alterations, the set of alterations comprising (i) responsive to predicting that the time series will exceed a threshold, a first reconfiguring of a file system resource, the first reconfiguring altering a capacity of the file system, and (ii) responsive to detecting the anomaly, a second reconfiguring of the file system resource, the second reconfiguring altering a capacity of the file system.

An embodiment includes a computer usable program product. The computer usable program product includes one or more computer-readable storage devices, and program instructions stored on at least one of the one or more storage devices.

An embodiment includes a computer system. The computer system includes one or more processors, one or more computer-readable memories, and one or more computer-readable storage devices, and program instructions stored on at least one of the one or more storage devices for execution by at least one of the one or more processors via at least one of the one or more memories.

BRIEF DESCRIPTION OF THE DRAWINGS

Certain novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
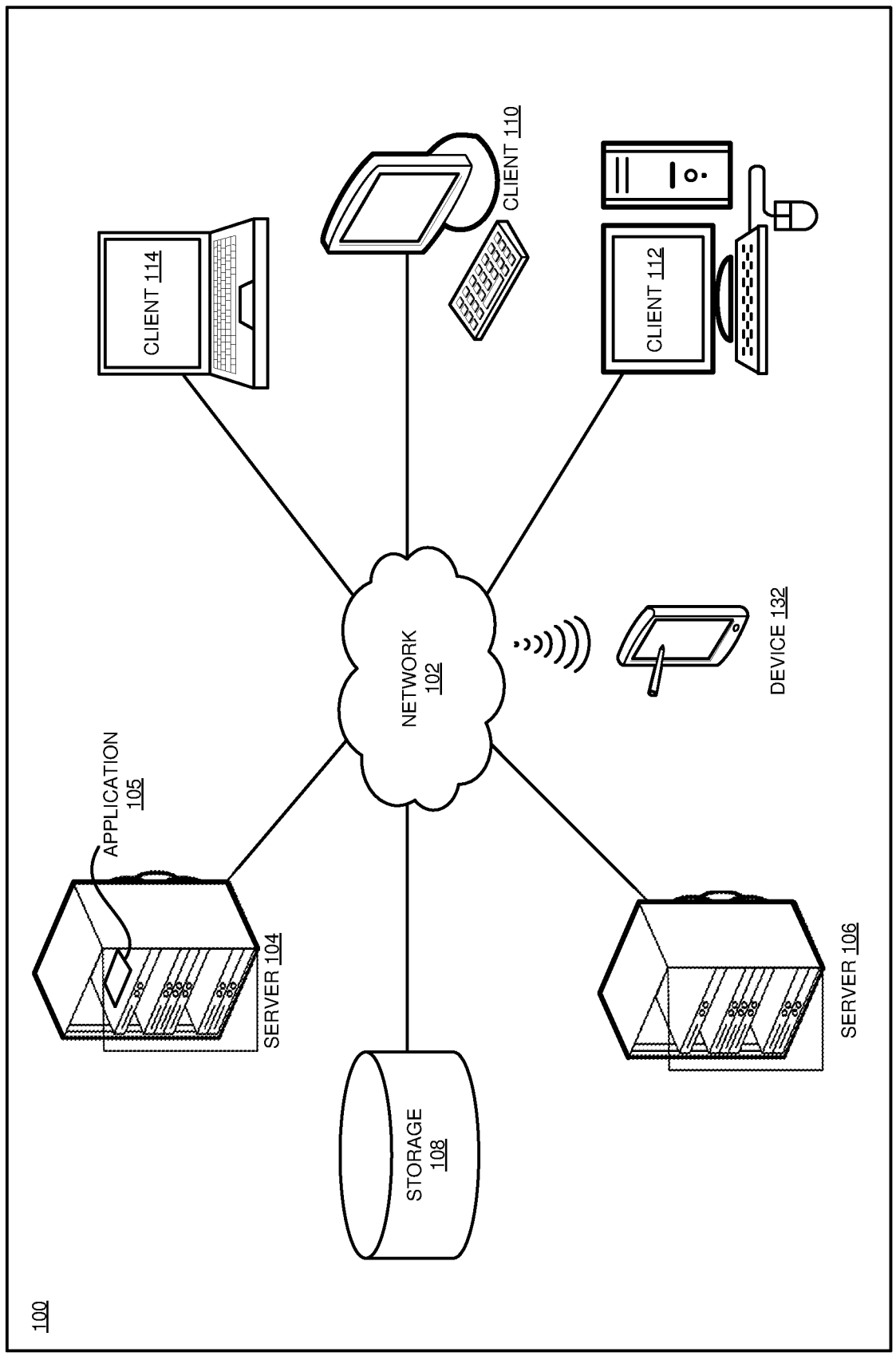
FIG. 1 depicts a block diagram of a network of data processing systems in which illustrative embodiments may be implemented.

The illustrative embodiments recognize that cost effective data center management requires that additional file system resources be configured and made available only when needed. Such resources must be purchased or leased, require maintenance, and consume resources such as electrical power and data center space whether the storage they provide is used or not. However, having too few file system resources prevents applications from executing efficiently or at all. Thus, configured file system resources should be matched closely to anticipated or actual need.

The illustrative embodiments recognize that managing thousands of file system directories, including continually performing file system clean-up and capacity management, is complex. One option is to use rule based management of file system utilization. For example, a rule might provide that if utilization rises above a certain threshold (e.g. ninety percent utilization), then notify a human operations team to take action, or configure and make available an additional file system resource. However, file system utilization patterns can vary from directory to directory based on executing workloads and their storage usage. Thus, a simple threshold-based rule might be too conservative in some circumstances and not conservative enough in others.

The illustrative embodiments also recognize that predicting file system utilization using machine learning techniques is computationally complex. Machine learning techniques such as forecasting (to predict trends) and anomaly detection (to predict utilization spikes) have been used to predict file system utilization for behaviorally complex file systems. However, because file system utilization patterns are often independent of each other, dimensionality reduction techniques that rely on pattern correlations may not work well. Thus, such machine learning techniques must be executed in parallel with each other to predict the utilization of each of, or each set of, thousands of directories, requiring a large amount of computing resources.

Because of this computational complexity, the illustrative embodiments recognize that it is important to utilize machine learning techniques to predict file system utilization only when other, simpler, methods such as rule-based techniques are inappropriate. In particular, the illustrative embodiments recognize that there is a need to predict file system utilization for cost-effective resource utilization, using a technique with a lower computational cost if appropriate to the data being analyzed.

The illustrative embodiments recognize that the presently available tools or solutions do not address these needs or provide adequate solutions for these needs. The illustrative embodiments used to describe the invention generally address and solve the above-described problems and other problems related to technique selection for file system utilization prediction.

An embodiment can be implemented as a software application. The application implementing an embodiment can be configured as a modification of an existing file system, as a separate application that operates in conjunction with an existing file system, a standalone application, or some combination thereof.

Particularly, some illustrative embodiments provide a method that executes a trained classification model, causing classification of file system usage data into a set of categories. If the data is categorized into a trend category, an embodiment constructs a time series of the data, and if the time series will cross a threshold, the embodiment causes a reconfiguring of a file system resource. If the data is categorized into a periodicity category, an embodiment detects an anomaly within the data, and causes a reconfiguring of a file system resource.

An embodiment includes a classification model. The classification model takes, as input, file system usage data, and classifies it into a category. Some non-limiting examples of file system usage data include the number of blocks (typically one kilobyte in size, but other block sizes are also possible), bytes, and file system data structures such as inodes that are used and available for use at a particular time, the number of files or directories, file size distribution, file and directory ages and modification rates, the distribution of files and directories across local and networked storage devices, and a combination of different types of usage data. In addition, file system usage data includes data output by a file system monitoring application. Some non-limiting examples of data output by a file system monitoring application include file system parameters such as disk IO rate, disk errors, bad sectors, and utilization rates of different types of storage (e.g. SSD, hard drive, and tape storage). In addition, different types of file systems, such as HDFS (Hadoop distributed file system) and GPFS (general parallel file system) also generate different types of file usage data.

One classification category is a trend category. In one embodiment, to be classified into the trend category, the input data must be generally increasing or decreasing over time. Another embodiment uses two trend categories, one for data that is generally increasing over time, and another for data that is generally decreasing over time. Another embodiment uses multiple trend categories, and classifies data into one of the trend categories according to the type of trend (e.g. linear and exponential).

Another classification category is a periodicity category. In one embodiment, to be classified into the periodicity category, the input data must have a pattern that repeats over time. For example, utilization of a file system used for backups might peak every night at two a.m. due to nightly backups, or file system utilization for a system supporting a large shopping application might increase around major shopping periods and then decrease during other times of the year.

Another classification category is a flat category. In one embodiment, to be classified into the flat category, the input data must not be in either of the trend or periodicity categories. For example, file system utilization data that remains relatively constant (within a set of predefined thresholds), without a definite trend or periodicity, might be classified into the flat category. In addition, different numbers of categories, and different classification criteria, are also possible and contemplated within the scope of the illustrative embodiments.

In embodiments, the classification model is a learning model implemented using any presently-known machine learning classification technique. Some non-limiting examples of machine learning classification techniques are logistic regression, naive Bayes, decision trees, random forests, support vector machines, k-nearest neighbors, and neural network-based techniques. Some machine learning classification techniques are supervised learning techniques, which require training using a training set of data before use. A training set of data includes file system usage data that has been classified, by human experts or an existing automated process, into one or more of the set of categories. During training, a classification model learns data patterns that correspond to categories.

Once a classification model is sufficiently trained, an embodiment executes the model, causing classification of file system usage data into a category. If the file system usage data is classified into a trend category, an embodiment constructs a time series of at least a portion of the data, using any presently-available time series construction technique. An embodiment predicts whether the time series will cross a predefined threshold. If file system usage is predicted to exceed a threshold, additional capacity should be added to the file system to support the increased usage. Thus, an embodiment causes a reconfiguring of a file system resource to add additional capacity. If file system usage is predicted to go below a threshold, the file system may not need as much capacity as it currently has, and hence some file system capacity can be reallocated to another use. Thus, an embodiment causes a reconfiguring of a file system resource, reallocating resources and optionally removing remove capacity.

If the file system usage data is classified into a periodicity category, an embodiment uses an anomaly detection technique on at least a portion of the data. An anomaly is an event or observation that differs significantly from the majority of the data or a pattern in the data. Anomaly detection is the identification of an anomaly. For example, if utilization of a file system used for backups peaks every night at two a.m. due to nightly backups, but there is an additional peak at five p.m. on one days (thus not conforming to the two-a.m.-peak pattern), the five p.m. peak is considered an anomaly. Similarly, if data for the same system does not include the regular two a.m. peak on a particular day, this absence is also considered an anomaly.

To perform the anomaly detection, an embodiment uses a presently-available anomaly detection model. One non-limiting example of an anomaly detection model is implemented using a Long Short Term Memory (LSTM) neural network. Other non-limiting examples of an anomaly detection model are ARIMA (Auto Regression Integrated Moving Average) and Recurrent Neural Network based HTM (Hierarchical Temporal Memory). If a file system has the capacity to handle an expected pattern of usage, an anomaly is an unexpected event for which the file system may not have capacity or for which the file system may have too much capacity. Thus, if an anomaly is detected, an embodiment causes a reconfiguring of a file system resource, altering the file system's capacity to respond to the anomaly.

If the file system usage data is classified into a flat category, file system capacity does not require reconfiguration to respond to a trend or an anomaly.

Following classification and any file system reconfiguration resulting from the classification, an embodiment uses a second set of file system usage data to adjust the classification model. For example, if the model classified a first set of usage data into the trend category, but the second set of data shows that the trend did not continue as the time series predicted, the first set of data was likely misclassified, and should have been in the periodicity or flat categories instead. Similarly, if the model classified a first set of usage data into the periodicity category, but the second set of data shows that an expected periodicity did not occur, the first set of data was likely misclassified, and should have been in the trend or flat categories instead.

An embodiment uses a second set of file system usage data to adjust a result of classification into the trend category. For example, a threshold used to trigger a file system reconfiguration due to increasing utilization may have been too high, causing a delay in adding capacity until after an additional resource was actually needed, or too low, causing capacity to be added before becoming necessary. As another example, a reconfiguration might have added insufficient or excessive additional capacity. Thus, an embodiment adjusts a threshold, a reconfiguration, or the type of prediction triggering a particular reconfiguration, to more closely align a future reconfiguration with predicted capacity need.

An embodiment uses a second set of file system usage data to adjust a result of classification into the periodicity category. In particular, subsequent data can show that what was initially perceived as an anomaly might actually be part of a pattern, or cause a small anomaly to become more apparent and thus easier to detect. Thus, an embodiment uses additional file system usage data to adjust the anomaly detection model. In addition, a reconfiguration resulting from an anomaly detection might have added insufficient or excessive additional capacity, as evidenced by subsequent usage data. Thus, an embodiment adjusts a reconfiguration or a type or size of anomaly triggering a particular reconfiguration, to more closely align a future reconfiguration with predicted capacity need.

An embodiment periodically repeats the classification and adjustment process, using additional file system usage data. Periodic monitoring ensures that a file system's capacity is efficiently managed, closely matching demand while avoiding both under-resourced configurations (in which demand exceeds supply, causing slow response time or even application malfunctions) and over-resourced configurations (in which supply exceeds demand, causing expensive resources to sit idle).

The manner of technique selection for file system utilization prediction described herein is unavailable in the presently available methods in the technological field of endeavor pertaining to file system administration. A method of an embodiment described herein, when implemented to execute on a device or data processing system, comprises substantial advancement of the functionality of that device or data processing system in executing a trained classification model, causing classification of file system usage data into a set of categories. If the data is categorized into a trend category, the method constructs a time series of the data, and if the time series will cross a threshold, the method causes a reconfiguring of a file system resource. If the data is categorized into a periodicity category, the method detects an anomaly within the data, and causes a reconfiguring of a file system resource.

The illustrative embodiments are described with respect to certain types of classification models, categories, predictions, thresholds, anomaly detection models, reconfigurations, adjustments, measurements, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 2:
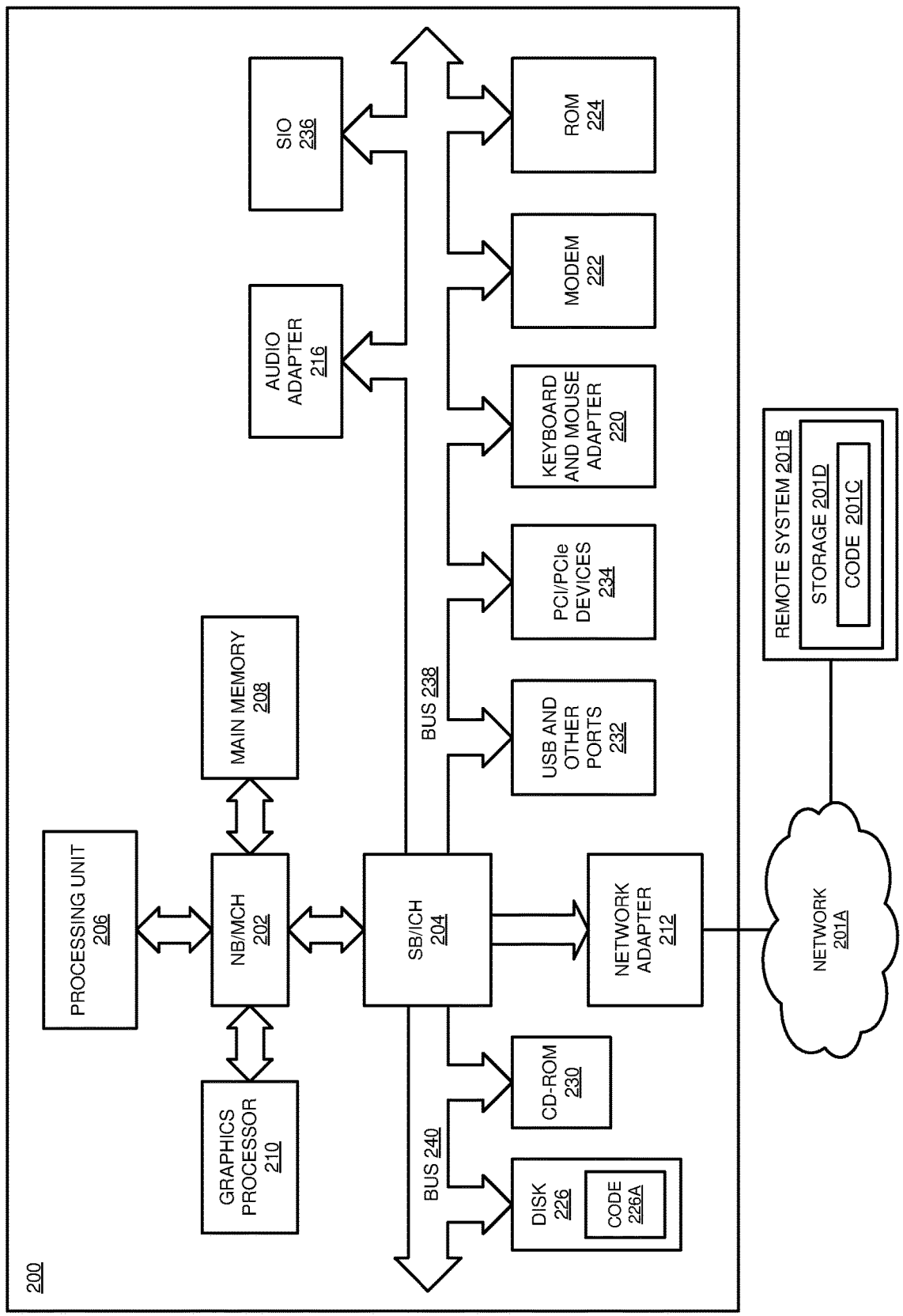
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

Application 105 implements an embodiment described herein. Application 105 executes in any of servers 104 and 106, clients 110, 112, and 114, and device 132. Storage 108 stores a file system managed using application 105.

Servers 104 and 106, storage unit 108, and clients 110, 112, and 114, and device 132 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as application 105 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. in another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
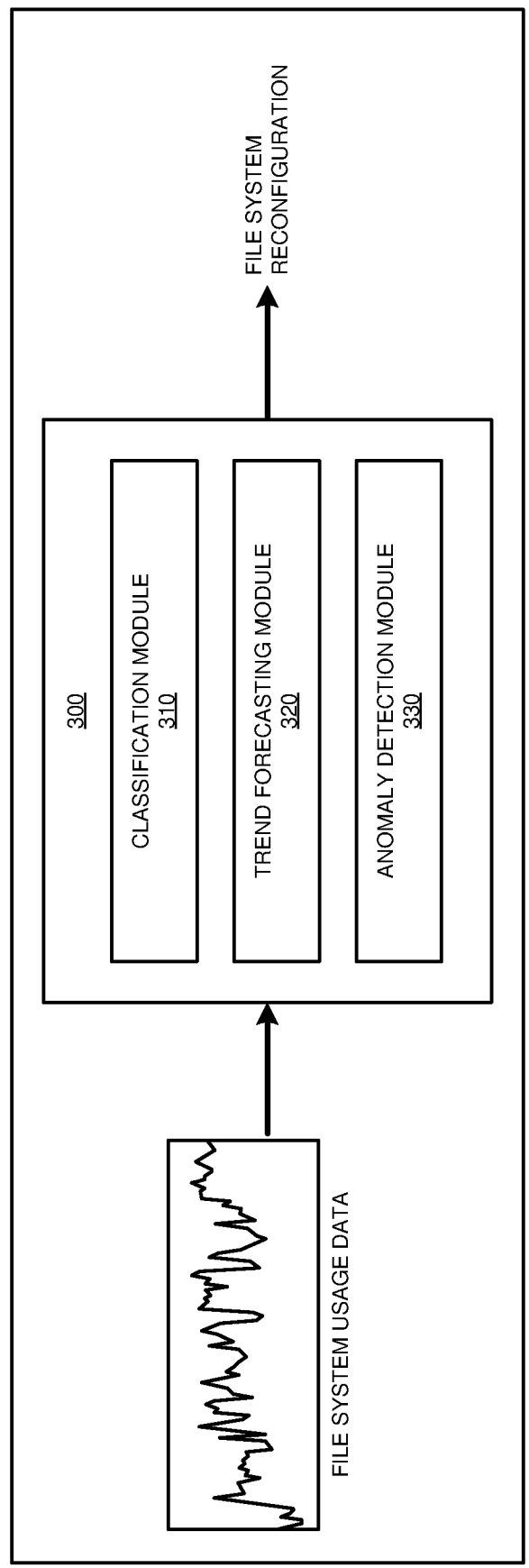
FIG. 3 depicts a block diagram of an example configuration for technique selection for file system utilization prediction in accordance with an illustrative embodiment.

With reference to FIG. 3, this figure depicts a block diagram of an example configuration for technique selection for file system utilization prediction in accordance with an illustrative embodiment. Application 300 is an example of application 105 in FIG. 1 and executes in any of servers 104 and 106, clients 110, 112, and 114, and device 132 in FIG. 1.

Classification module 310 executes a trained classification model, causing classification of file system usage data into a category.

If module 310 classifies file system usage data into a trend category, trend forecasting module 320 constructs a time series of at least a portion of the data, using any presently-available time series construction technique. Module 320 predicts whether the time series will cross a predefined threshold. If file system usage is predicted to exceed a threshold, additional capacity should be added to the file system to support the increased usage. Thus, module 320 causes a reconfiguring of a file system resource to add additional capacity. If file system usage is predicted to go below a threshold, the file system may not need as much capacity as it currently has, and hence some file system capacity can be reallocated to another use. Thus, module 320 causes a reconfiguring of a file system resource, reallocating resources and optionally removing remove capacity.

If module 310 classifies file system usage data into a trend category, anomaly forecasting module 330 uses an anomaly detection technique on at least a portion of the data. To perform the anomaly detection, module 330 uses a presently-available anomaly detection model. If a file system has the capacity to handle an expected pattern of usage, an anomaly is an unexpected event for which the file system may not have capacity or for which the file system may have too much capacity. Thus, if an anomaly is detected, module 330 causes a reconfiguring of a file system resource, altering the file system's capacity to respond to the anomaly.

Following classification and any file system reconfiguration resulting from the classification, application 300 uses a second set of file system usage data to adjust the classification model of module 310, a threshold, reconfiguration, or the type of prediction triggering a particular reconfiguration of module 320, or the anomaly detection model, reconfiguration, or a type or size of anomaly triggering a particular reconfiguration of module 330. Application 300 also periodically repeats the classification and adjustment process, using additional file system usage data. Periodic monitoring ensures that a file system's capacity is efficiently managed, closely matching demand while avoiding both under-resourced and over-resourced configurations.

Figure 4:
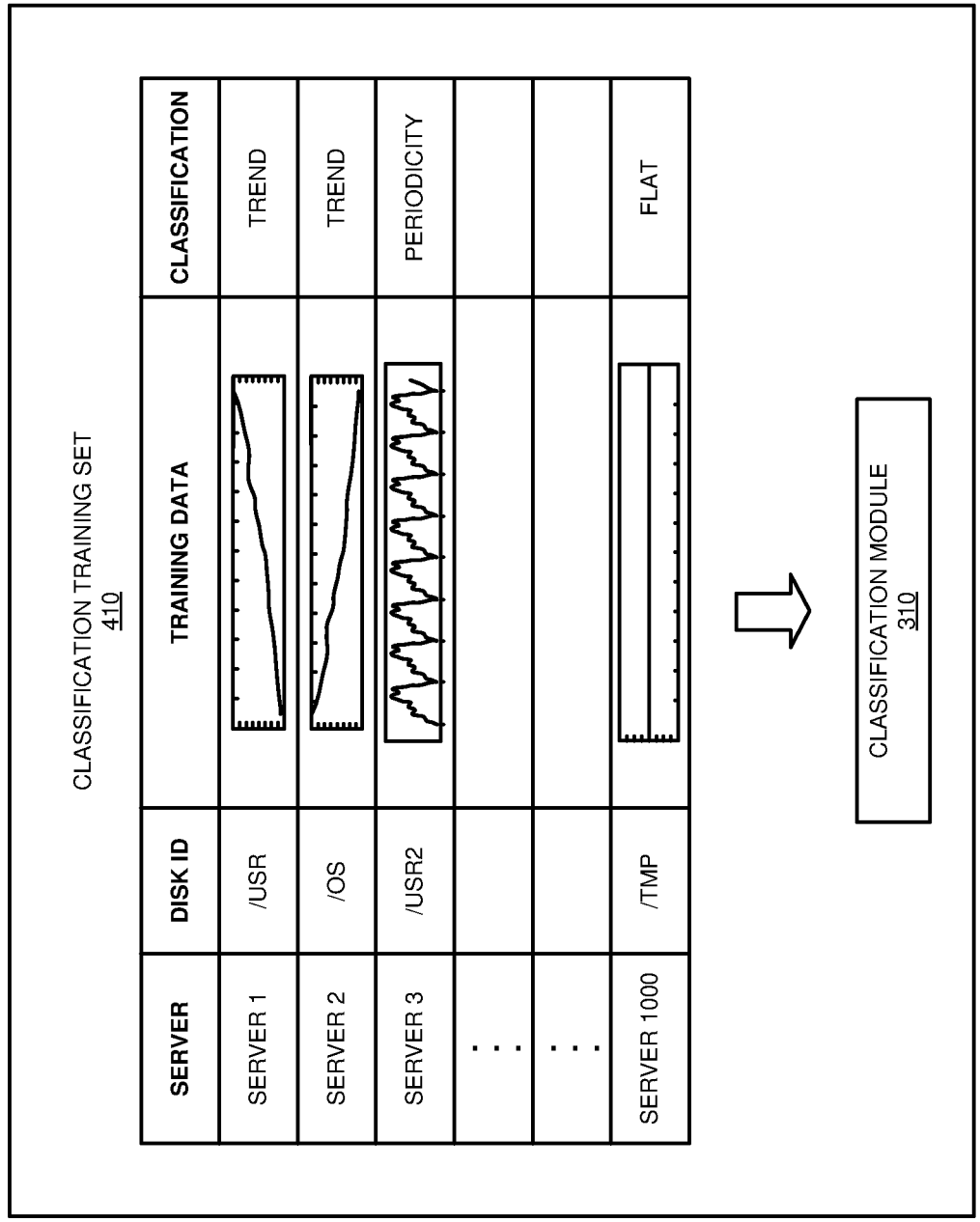
FIG. 4 depicts an example of technique selection for file system utilization prediction in accordance with an illustrative embodiment.

With reference to FIG. 4, this figure depicts an example of technique selection for file system utilization prediction in accordance with an illustrative embodiment. The example can be executed using application 300 in FIG. 3. Classification module 310 is the same as classification module 310 in FIG. 3.

In particular, FIG. 4 depicts an example of training the classification model of module 310. Classification training set 410 includes file system usage data and corresponding classifications into one or more of the set of categories. During training, a classification model learns data patterns that correspond to categories.

Figure 5:
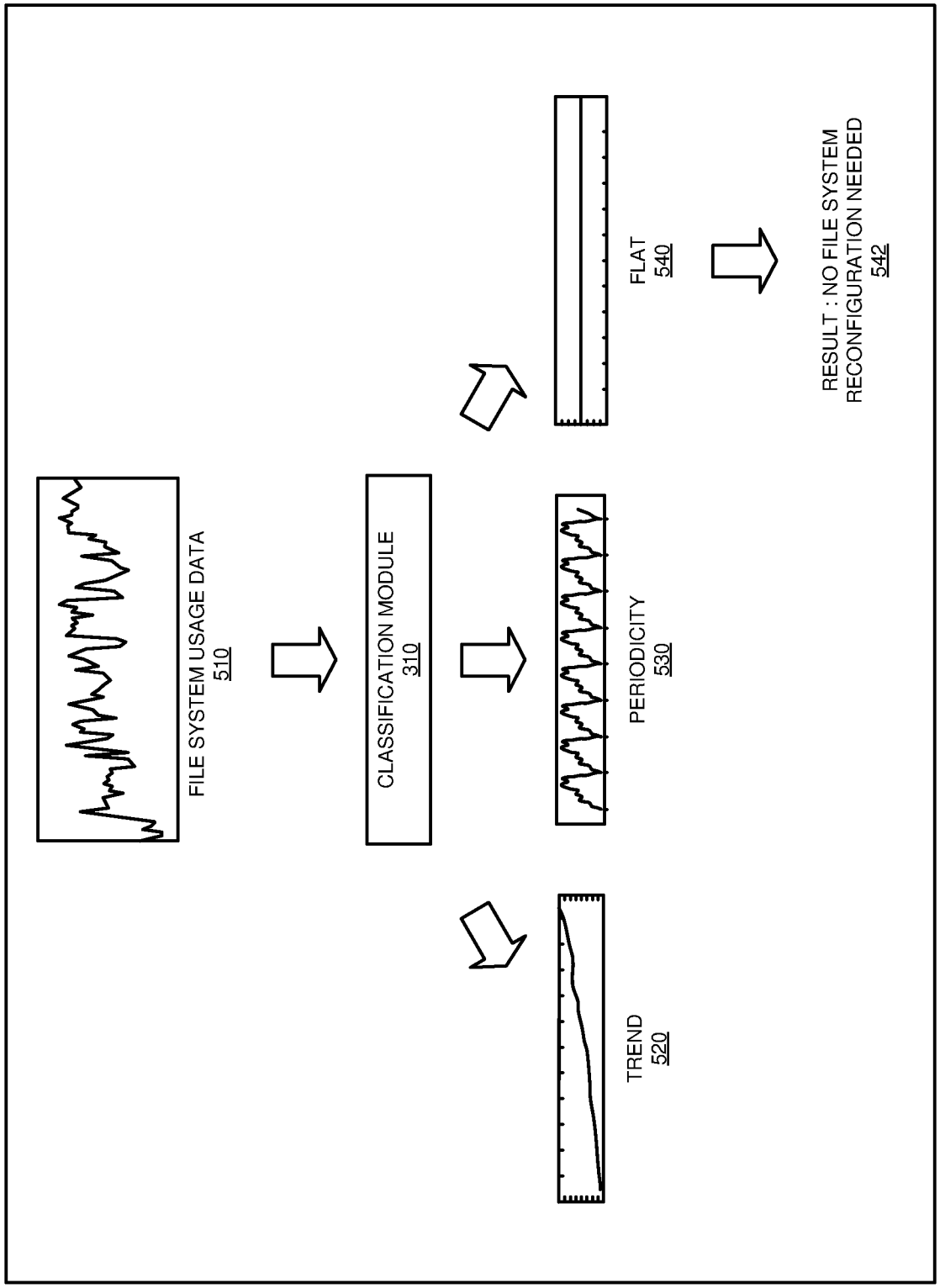
FIG. 5 depicts an example of technique selection for file system utilization prediction in accordance with an illustrative embodiment.

With reference to FIG. 5, this figure depicts an example of technique selection for file system utilization prediction in accordance with an illustrative embodiment. The example can be executed using application 300 in FIG. 3. Classification module 310 is the same as classification module 310 in FIG. 3.

Classification module 310 takes, as input, file system usage data 510, and classifies the data into three categories: trend 520, periodicity 530, and flat 540. If data 510 is classified into flat category 540, the result is result 542: file system capacity does not require reconfiguration.

Figure 6:
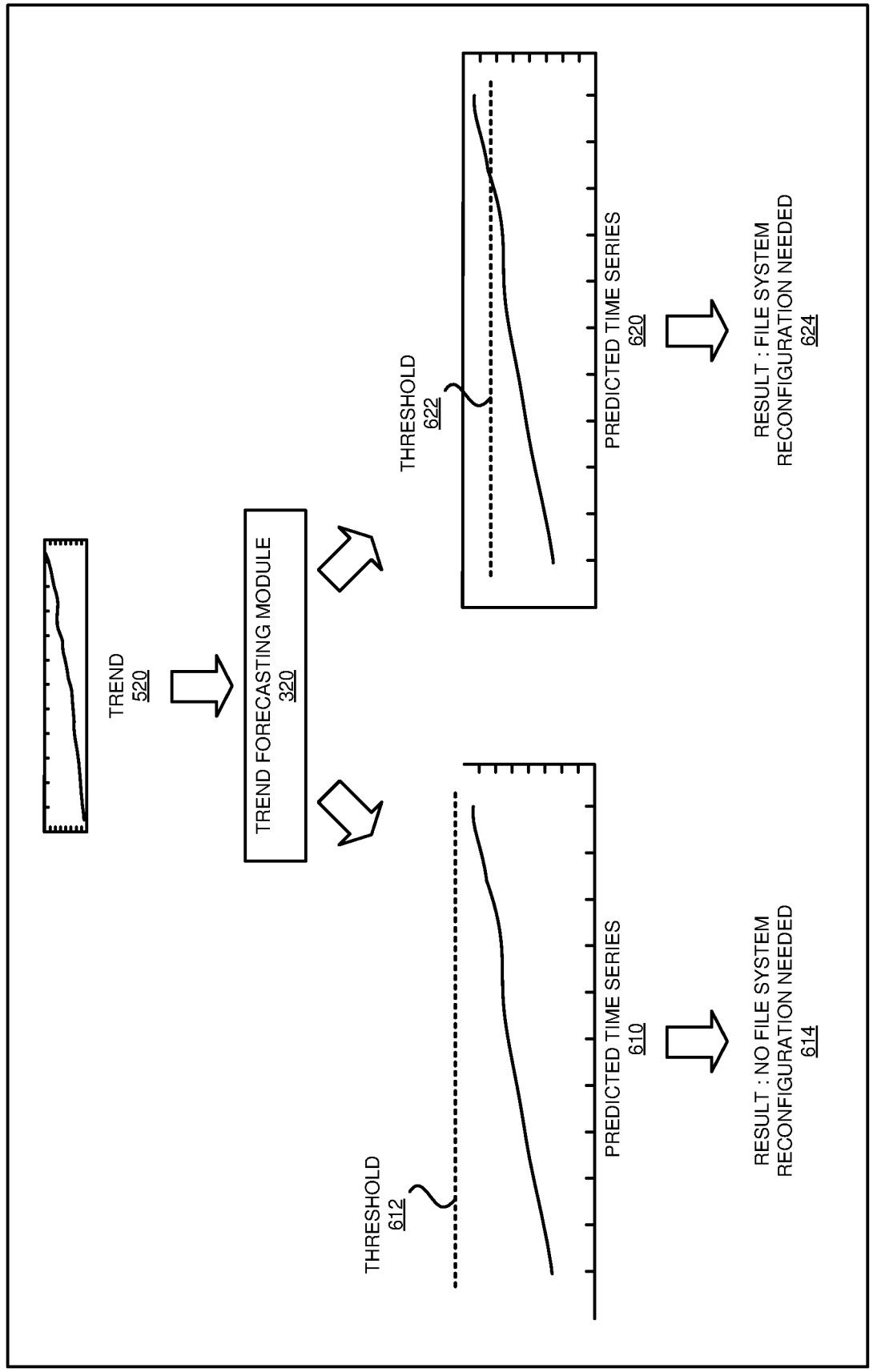
FIG. 6 depicts a continuing example of technique selection for file system utilization prediction in accordance with an illustrative embodiment.

With reference to FIG. 6, this figure depicts a continuing example of technique selection for file system utilization prediction in accordance with an illustrative embodiment. The example can be executed using application 300 in FIG. 3. Trend forecasting module 320 is the same as trend forecasting module 320 in FIG. 3.

As depicted, file system usage data has been classified into a trend category 520. Thus, trend forecasting module 320 constructs a time series of at least a portion of the data, and predicts whether the time series will cross a predefined threshold. For example, one example output of module 320 is predicted time series 610, in which threshold 612 is not predicted to be exceeded. Thus, result 614 is produced, in which no file system reconfiguration is needed. Another example output of module 320 is predicted time series 620, in which threshold 622 is predicted to be exceeded. Thus, result 624 is produced, in which a file system reconfiguration is needed to accommodate the anticipated need for additional capacity.

Figure 7:
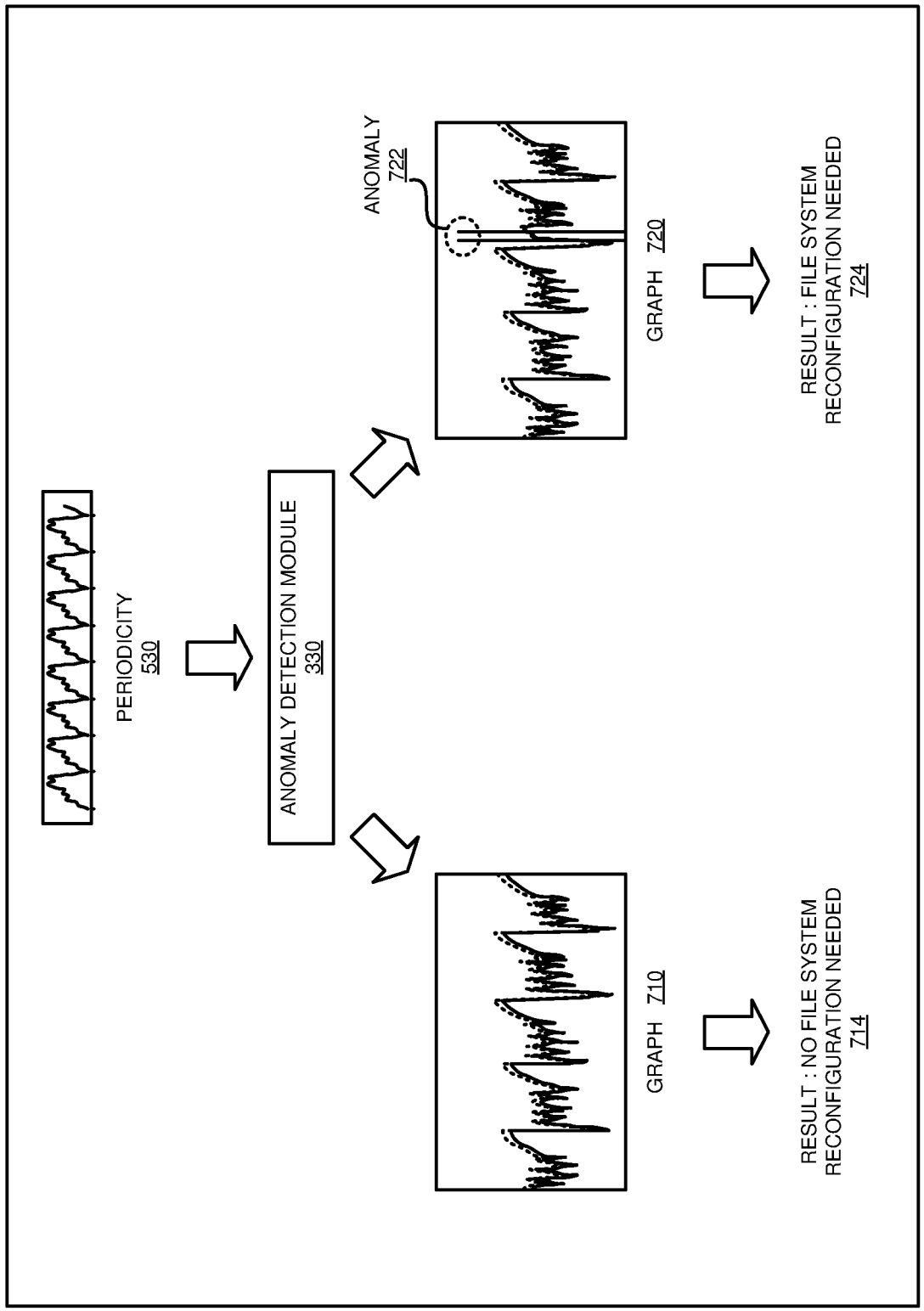
FIG. 7 depicts a continuing example of technique selection for file system utilization prediction in accordance with an illustrative embodiment.

With reference to FIG. 7, this figure depicts a continuing example of technique selection for file system utilization prediction in accordance with an illustrative embodiment. Anomaly detection module 330 is the same as anomaly detection module 330 in FIG. 3.

As depicted, file system usage data has been classified into a periodicity category 530. Thus, anomaly detection module 330 determines whether the data looks like example graph 710, without an anomaly, or example graph 720, which includes anomaly 722. If the data looks like example graph 710, without an anomaly, result 714 is produced, in which no file system reconfiguration is needed. If the data looks like example graph 720, with anomaly 722, result 724 is produced, in which a file system reconfiguration is needed to accommodate the anomaly.

Figure 8:
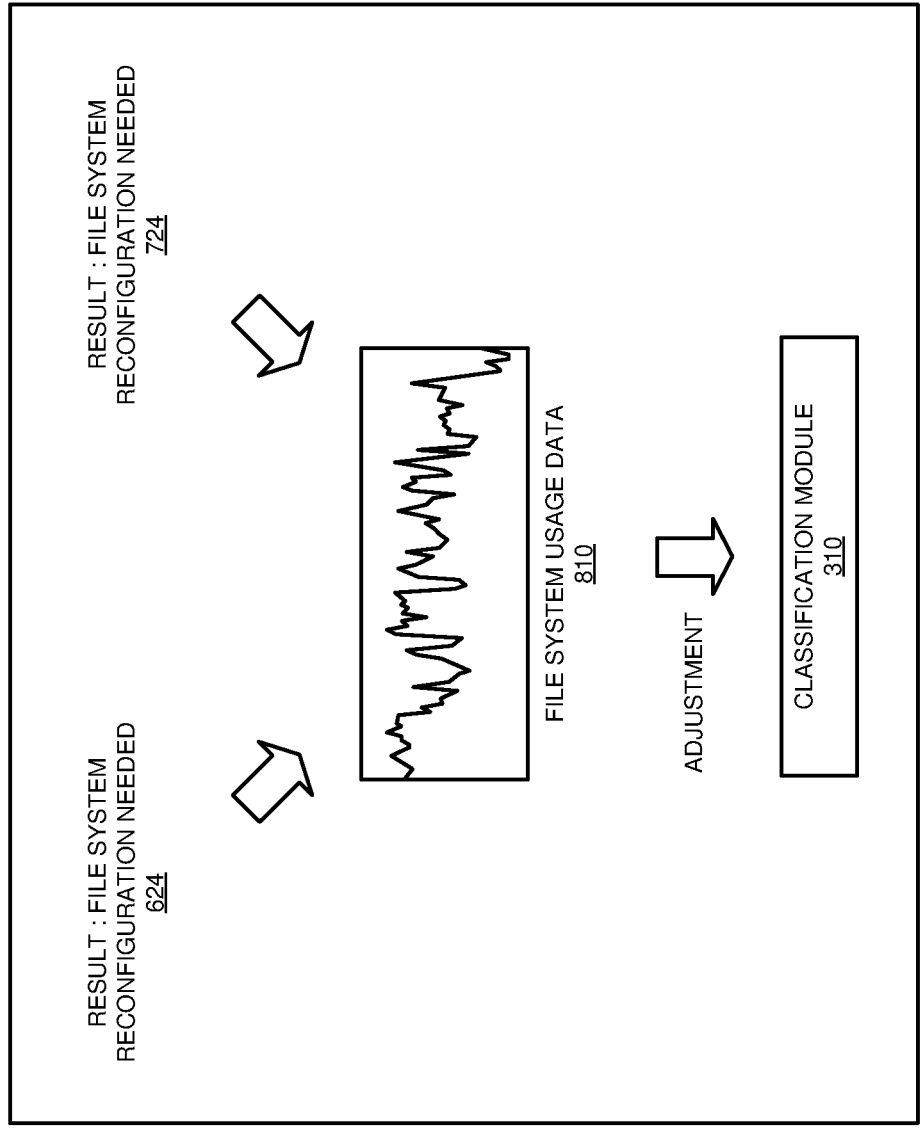
FIG. 8 depicts a continuing example of technique selection for file system utilization prediction in accordance with an illustrative embodiment.

With reference to FIG. 8, this figure depicts a continuing example of technique selection for file system utilization prediction in accordance with an illustrative embodiment. Classification module 310 is the same as classification module 310 in FIG. 3. Result 624 is the same as result 624 in FIG. 6. Result 724 is the same as result 724 in FIG. 7.

As depicted, following results 624 or 724, application 300 uses file system usage data 810 to adjust the classification model of classification module 310.

Figure 9:
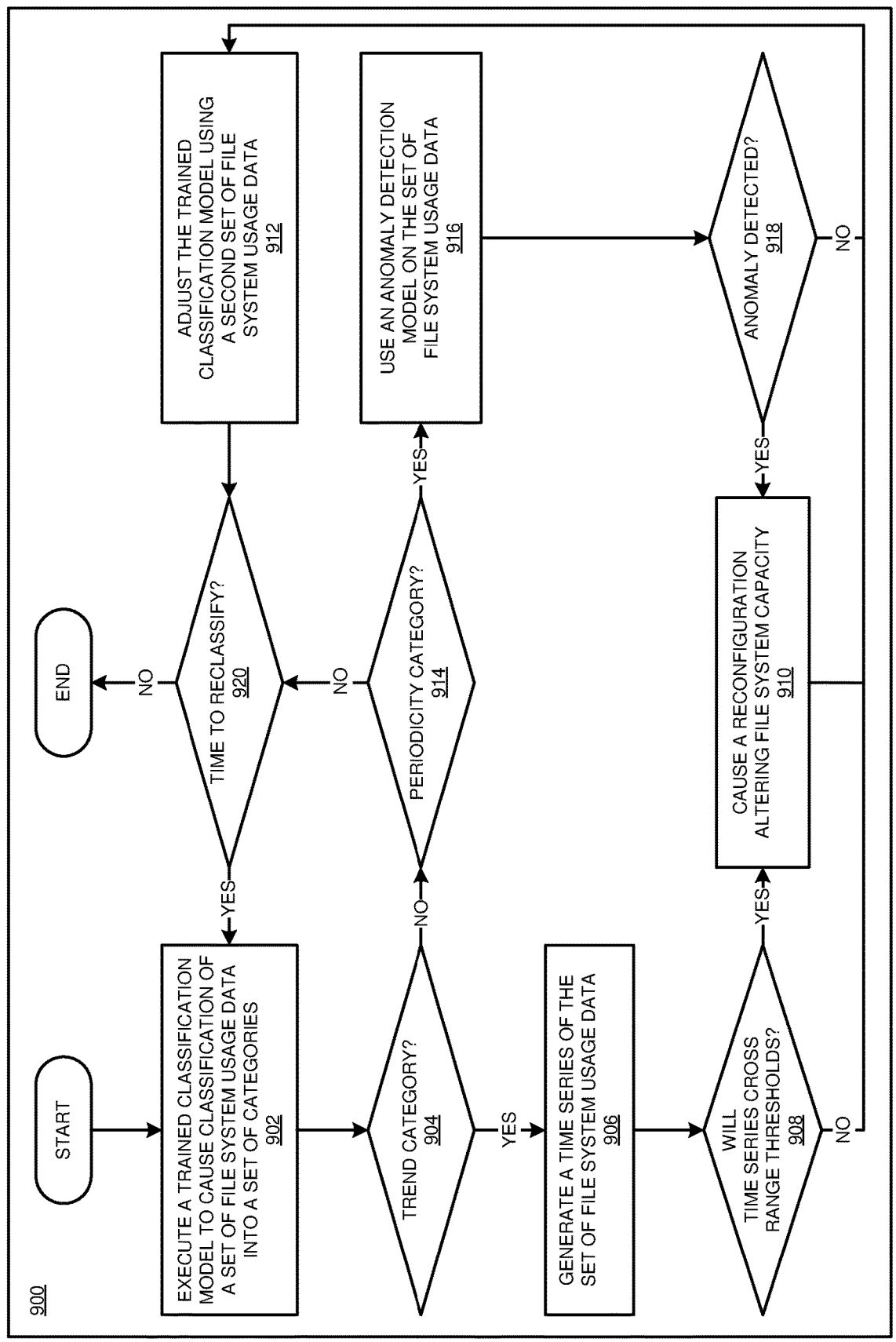
FIG. 9 depicts a flowchart of an example process for technique selection for file system utilization prediction in accordance with an illustrative embodiment.

With reference to FIG. 9, this figure depicts a flowchart of an example process for technique selection for file system utilization prediction in accordance with an illustrative embodiment. Process 900 can be implemented in application 300 in FIG. 3.

In block 902, the application executes a trained classification model to cause classification of a set of file system usage data into a set of categories. In block 904, the application determines whether the data has been classified into the trend category. If so ("YES" path of block 904), in block 906, the application generates a time series of the set of file system usage data. In block 908, the application determines whether or not the time series will cross one or more range thresholds. If so ("YES" path of block 908), in block 910, the application causes a reconfiguration altering file system capacity. If not ("NO" path of block 908) the application skips block 910. In block 912, the application adjusts the trained classification model using a second set of file system usage data, then in block 920 the application determines whether it is time to reclassify file system usage data. If so ("YES") path of block 920, the application returns to block 902. Otherwise ("NO" path of block 920), the application ends. If the data has not been classified into the trend category ("NO" path of block 904), in block 914 the application determines whether the data has been classified into the periodicity category. If so ("YES" path of block 914), in block 916, the application uses an anomaly detection model on the set of file system usage data. In block 918, the application determines whether or not an anomaly has been detected. If so ("YES" path of block 918), the application moves to block 910. If not ("NO" path of block 918) the application skips block 910 and moves to block 912.

Figure 10:
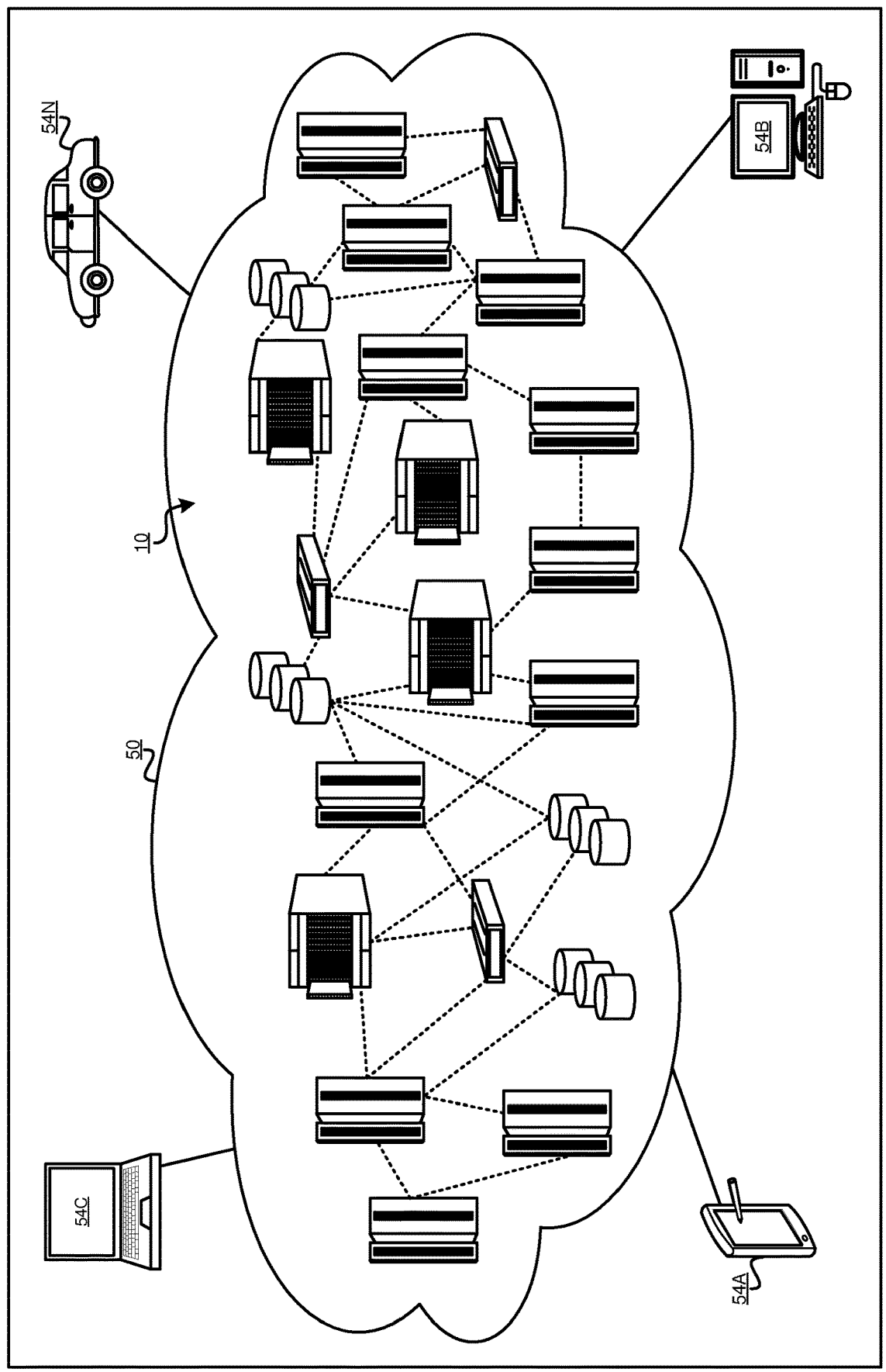
FIG. 10 depicts a cloud computing environment according to an embodiment of the present invention.

Referring now to FIG. 10, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 12 are intended to be illustrative only and that computing nodes 10 and cloud computing environment 50 can communicate with any type of computerized device over any type of network and/or network addressable connection (e.g., using a web browser).

Figure 11:
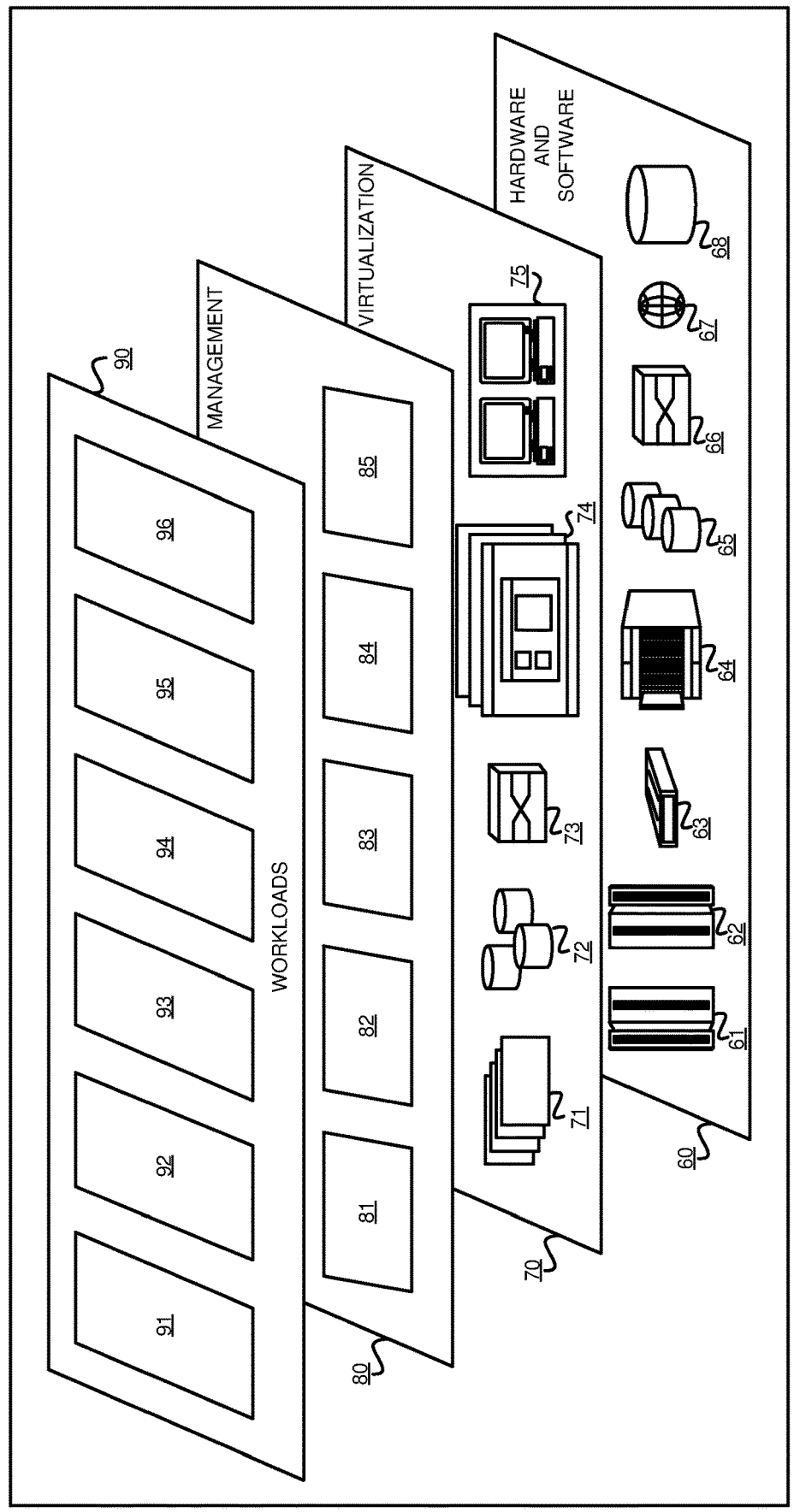
FIG. 11 depicts abstraction model layers according to an embodiment of the present invention.

Referring now to FIG. 11, a set of functional abstraction layers provided by cloud computing environment 50 (FIG. 12) is shown. It should be understood in advance that the components, layers, and functions shown in FIG. 13 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and application selection based on cumulative vulnerability risk assessment 96.

Thus, a computer implemented method, system or apparatus, and computer program product are provided in the illustrative embodiments for technique selection for file system utilization prediction and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method comprising:
   executing, using a processor and a memory, a trained classification model, the executing causing a classification of a first set of file system usage data into a set of categories, the set of categories comprising a trend category, a flat category, and a periodicity category, the first set of file system usage data comprising usage data of a file system on at least one data storage media device, wherein the flat category classification describes a condition in response to the first set of file system usage data remaining above a first threshold and below a second threshold of a set of predefined thresholds;
   causing, using the processor and the memory, at least one operation from a set of operations, the set of operations comprising (i) generating, responsive to the first set of file system usage data being classified into the trend category, a time series of the first set of file system usage data, (ii) detecting, responsive to the first set of file system usage data being classified into the periodicity category, using an anomaly detection model, an anomaly within the first set of file system usage data, and (iii) determining, responsive to the first set of file system data usage being classified into the flat category, that that no changes to the file system are necessary; and
   causing, using the processor and the memory, when the category is not the flat category, at least one alteration from a set of alterations, the set of alterations comprising (i) responsive to predicting that the time series will exceed the first threshold of the set of predefined thresholds, a first reconfiguring of a file system resource, the first reconfiguring altering a capacity of the file system by adding processing and network bandwidth to meet a processing and network bandwidth forecast associated with the time series, and (ii) responsive to detecting the anomaly, a second reconfiguring of the file system resource, the second reconfiguring altering a capacity of the file system by adding processing and network bandwidth to meet a processing and network bandwidth forecast associated with the anomaly.

2. The computer-implemented method of claim 1, further comprising:
   adjusting, using a second set of file system usage data, the trained classification model, the second set of file system usage data comprising file system usage data collected subsequent to the first reconfiguring, or the second reconfiguring, or a no change state for the flat category.

3. The computer-implemented method of claim 1, further comprising: adjusting, using a second set of file system usage data, the first threshold of the set of predefined thresholds, the second set of file system usage data comprising file system usage data collected subsequent to the first reconfiguring.

4. The computer-implemented method of claim 1, further comprising: adjusting, using a second set of file system usage data, the first reconfiguring, the second set of file system usage data comprising file system usage data collected subsequent to the first reconfiguring.

5. The computer-implemented method of claim 1, further comprising: adjusting, using a second set of file system usage data, the anomaly detection model, the second set of file system usage data comprising file system usage data collected subsequent to the second reconfiguring.

6. The computer-implemented method of claim 1, further comprising: adjusting, using a second set of file system usage data, the second reconfiguring, the second set of file system usage data comprising file system usage data collected subsequent to the second reconfiguring.

7. The computer-implemented method of claim 1, further comprising: causing, using the processor and the memory, a third alteration, the third alteration comprising, responsive to predicting that the time series will go below the second threshold of the set of predefined thresholds, a third reconfiguration of the file system, the third reconfiguring altering a capacity of the file system on the storage device by reducing processing and network bandwidth.

8. The computer-implemented method of claim 1, further comprising:
responsive to predicting that the time series will go below the first threshold, reallocating a portion of file system capacity to another use, wherein processing and network bandwidth are reallocated to the other use,
wherein the trained classification model comprises a neural network classification model trained using a training set, the training set comprising file system usage data classified into a category in the set of categories.

9. A computer program product for file system utilization prediction, the computer program product comprising:
one or more computer readable storage media, and program instructions collectively stored on the one or more computer readable storage media, the program instructions comprising:
program instructions to execute, using a processor and a memory, a trained classification model, the executing causing a classification of a first set of file system usage data into a set of categories, the set of categories comprising a trend category, a periodicity category, and a flat category, the first set of file system usage data comprising usage data of a file system on a data storage device, wherein the flat category classification describes a condition in response to the first set of file system usage data remaining above a first threshold and below a second threshold of a set of predefined thresholds, the file system comprising at least one storage media device managing files and filenames in data structures, the at least one storage media device comprising at least one of a local data storage device and a remote storage device accessible over a network;
program instructions to cause, using the processor and the memory, at least one operation from a set of operations, the set of operations comprising (i) generating, responsive to the first set of file system usage data being classified into the trend category, a time series of the first set of file system usage data, (ii) detecting, responsive to the first set of file system usage data being classified into the periodicity category, using an anomaly detection model, an anomaly within the first set of file system usage data, and (iii) determining, responsive to the first set of file system data usage being classified into the flat category, that no changes to the file system are necessary; and
program instructions to cause, using the processor and the memory, when the category is not the flat category, at least one alteration from a set of alterations, the set of alterations comprising (i) responsive to predicting that the time series will exceed the first threshold of the set of predefined thresholds, a first reconfiguring of a file system resource, the first reconfiguring altering a capacity of the file system by adding one or more virtual machines to meet a virtual machines forecast associated with the time series, and (ii) responsive to detecting the anomaly, a second reconfiguring of the file system resource, the second reconfiguring altering a capacity of the file system by adding one or more virtual machines to meet a virtual machines forecast associated with the anomaly.

10. The computer program product of claim 9, further comprising: program instructions to adjust, using a second set of file system usage data, the trained classification model, the second set of file system usage data comprising file system usage data collected subsequent to the first reconfiguring, or the second reconfiguring, or a no change state for the flat category.

11. The computer program product of claim 9, further comprising: program instructions to adjust, using a second set of file system usage data, the first threshold of the set of predefined thresholds, the second set of file system usage data comprising file system usage data collected subsequent to the first reconfiguring.

12. The computer program product of claim 9, further comprising: program instructions to adjust, using a second set of file system usage data, the first reconfiguring, the second set of file system usage data comprising file system usage data collected subsequent to the first reconfiguring.

13. The computer program product of claim 9, further comprising: program instructions to adjust, using a second set of file system usage data, the anomaly detection model, the second set of file system usage data comprising file system usage data collected subsequent to the second reconfiguring.

14. The computer program product of claim 9, further comprising: program instructions to adjust, using a second set of file system usage data, the second reconfiguring, the second set of file system usage data comprising file system usage data collected subsequent to the second reconfiguring.

15. The computer program product of claim 9, further comprising: Fri.

16. The computer program product of claim 9, wherein the trained classification model comprises a neural network classification model trained using a training set, the training set comprising file system usage data classified into a category in the set of categories, and
wherein the anomaly detection model comprises a model type of a group of anomaly detection models consisting of a Long Short Term Memory (LSTM) neural network, an Auto Regression Integrated Moving Average (ARIMA), and a Recurrent Neural Network based Hierarchical Temporal Memory (HTM).

17. The computer program product of claim 9, wherein the stored program instructions are stored in the at least one of the one or more storage media of a local data processing system, and wherein the stored program instructions are transferred over a network from a remote data processing system.

18. The computer program product of claim 9, wherein the stored program instructions are stored in the at least one of the one or more storage media of a server data processing system, and wherein the stored program instructions are downloaded over a network to a remote data processing system for use in a computer readable storage device associated with the remote data processing system.

19. The computer program product of claim 9, wherein the computer program product is provided as a service in a cloud environment.

20. A computer system comprising one or more processors, one or more computer-readable memories, and one or more computer-readable storage devices, and program instructions stored on at least one of the one or more storage devices for execution by at least one of the one or more processors via at least one of the one or more memories, the stored program instructions comprising:
program instructions to execute, using a processor and a memory, a trained classification model, the executing causing a classification of a first set of file system usage data into a set of categories, the set of categories comprising a trend category, a periodicity category, and a flat category, the first set of file system usage data comprising usage data of a file system on a data storage device, wherein the flat category classification describes a condition in response to the first set of file system usage data remaining above a first threshold and below a second threshold of a set of predefined thresholds, the file system comprising at least one storage media device managing files and filenames in data structures;

program instructions to cause, using the processor and the memory, at least one operation from a set of operations, the set of operations comprising (i) generating, responsive to the first set of file system usage data being classified into the trend category, a time series of the first set of file system usage data, (ii) detecting, responsive to the first set of file system usage data being classified into the periodicity category, using an anomaly detection model, an anomaly within the first set of file system usage data, and (iii) determining, responsive to the first set of file system data usage being classified into the flat category, that no changes to the file system are necessary; and program instructions to cause, using the processor and the memory, when the category is not the flat category, at least one alteration from a set of alterations, the set of alterations comprising (i) responsive to predicting that the time series will exceed the first threshold of the set of predefined thresholds, a first reconfiguring of a file system resource, the first reconfiguring altering a capacity of the file system by adding memory and at least one application to meet a memory and application forecast associated with the time series, and (ii) responsive to detecting the anomaly, a second reconfiguring of the file system resource, the second reconfiguring altering a capacity of the file system by adding memory and at least one application to meet a memory and application forecast associated with the anomaly.

* * * * *